C. C. FARMER.
STAFF EXCHANGE BOX.
APPLICATION FILED MAY 12, 1920.

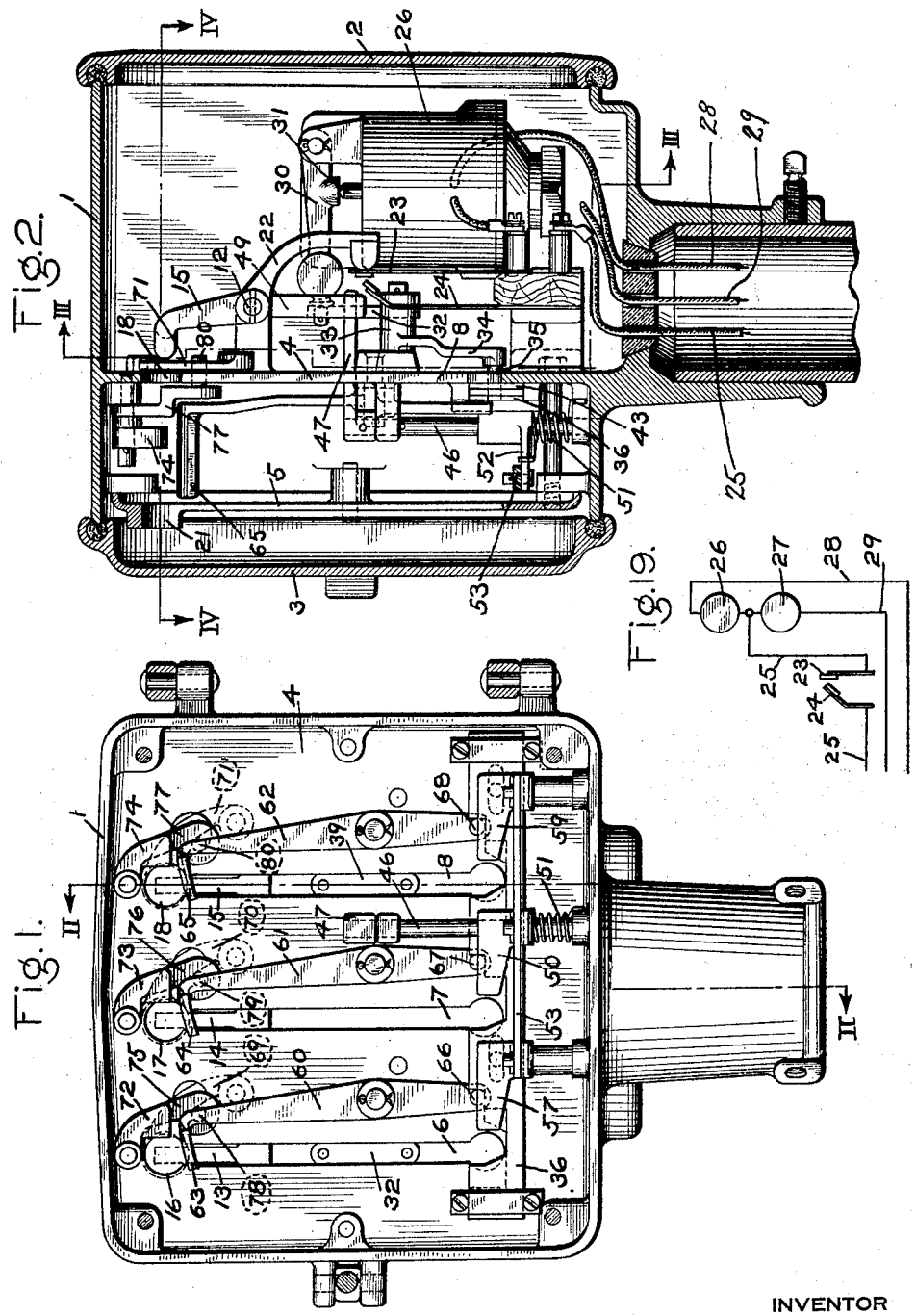

1,400,592.

Patented Dec. 20, 1921.
3 SHEETS—SHEET 2.

INVENTOR
CLYDE C. FARMER
BY *Wm. M. Cady*
ATTORNEY

C. C. FARMER.
STAFF EXCHANGE BOX.
APPLICATION FILED MAY 12, 1920.
1,400,592.
Patented Dec. 20, 1921.
3 SHEETS—SHEET 3.
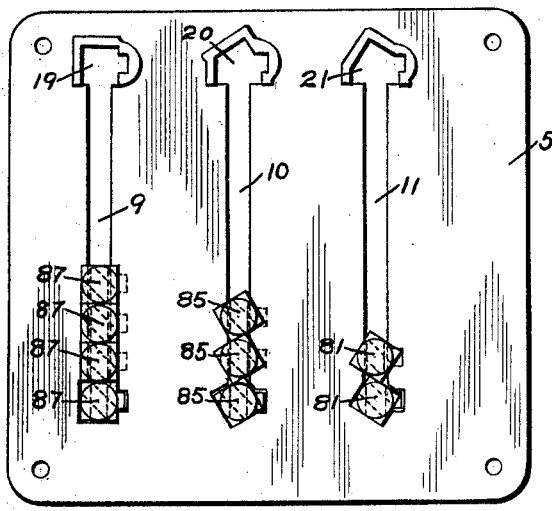
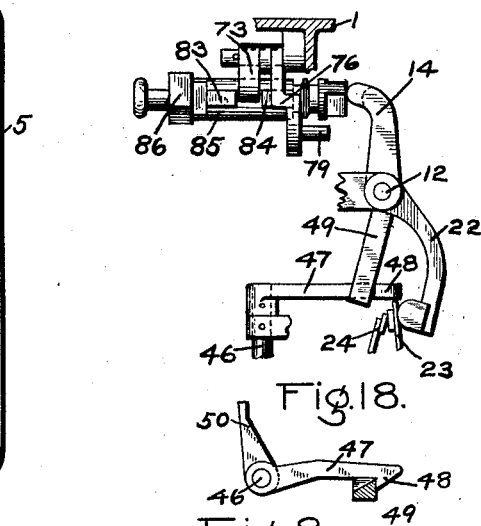
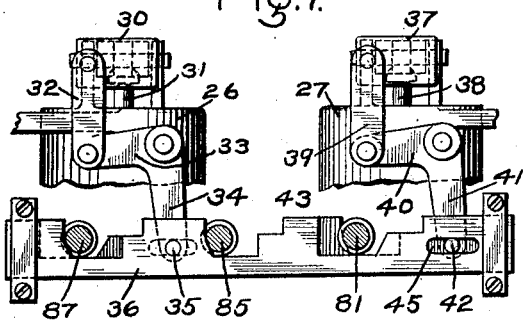
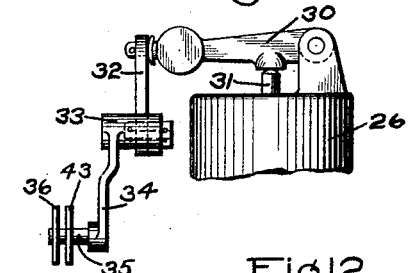
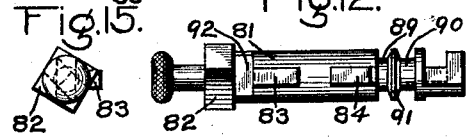
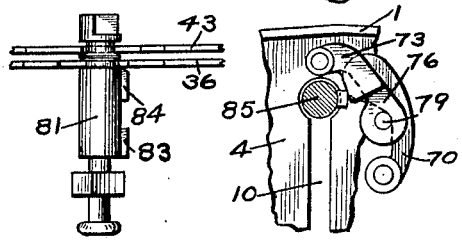
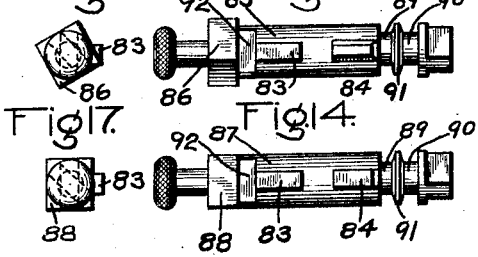
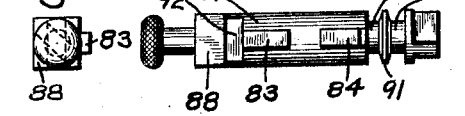
INVENTOR
CLYDE C. FARMER
BY *Wm. M. Cady*
ATTORNEY

UNITED STATES PATENT OFFICE.

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

STAFF-EXCHANGE BOX.

1,400,592.     Specification of Letters Patent.     Patented Dec. 20, 1921.

Application filed May 12, 1920. Serial No. 380,858.

*To all whom it may concern:*

Be it known that I, CLYDE C. FARMER, a citizen of the United States, residing at Edgewood, in the county of Allegheny and State of Pennsylvania, have invented new and useful Improvements in Staff-Exchange Boxes, of which the following is a specification.

This invention relates to a train speed control equipment, and more particularly to an apparatus adapted to be controlled by removable staffs, such as that disclosed in my companion application, Serial No. 380,856, filed May 12, 1920.

With a train speed control equipment of the above character, a plurality of different staffs are employed, the use of a particular staff determining the speed ratio between the driving member and the speed governor, so that the permissible range of speeds at which the train may run is adjusted for the particular service according to the staff employed.

The principal object of my invention is to provide a staff exchange box under the control of a tower man or train despatcher, from which the engineer may obtain only a staff as permitted by the tower man and only in exchange for a staff already in the possession of the engineer.

Figure 4:
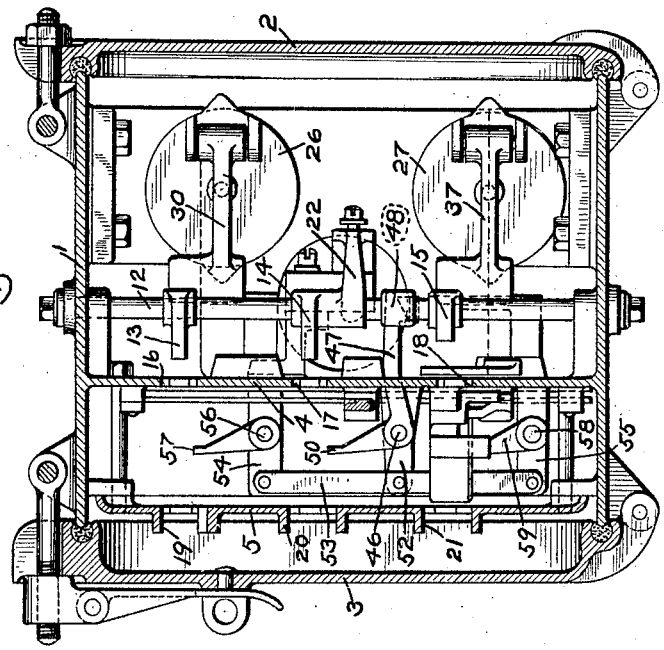
Figure 3:
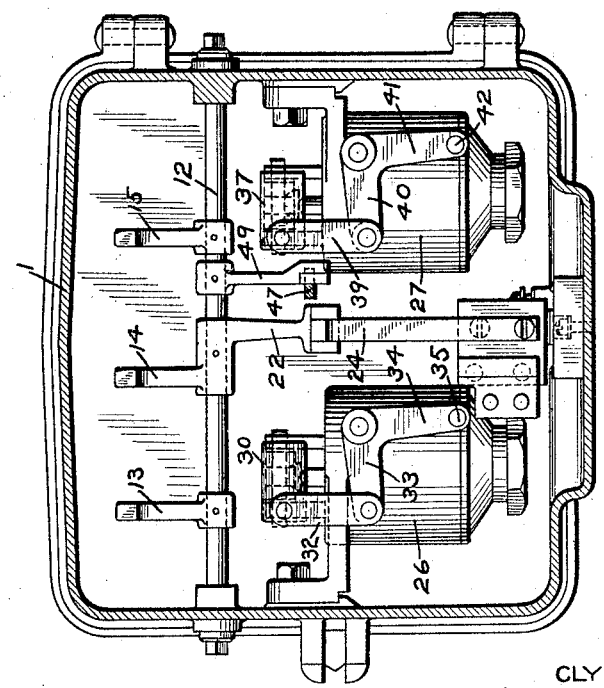

In the accompanying drawings: Figure 1 is a front elevation of a staff exchange box, constructed according to my invention, with the cover and the front guide plate removed; Fig. 2 a section on the line II—II of Fig. 1; Fig. 3 a section on the line III—III of Fig. 2; Fig. 4 a section on the line IV—IV of Fig. 2; Fig. 5 a face view of the front guide plate; Fig. 6 a detail view of the mechanism by which the magnet circuit is closed by the insertion of a staff; Fig. 7 a front view of the magnet controlled mechanism for locking and releasing the staffs; Fig. 8 a side view thereof; Fig. 9 a face view of the rear staff locking bar; Fig. 10 a plan view of a staff in position with relation to the locking bars; Fig. 11 a fragmentary view, showing the action of a staff as it is inserted in the staff box; Figs. 12, 13, and 14, side views of the different staffs employed; Figs. 15, 16, and 17 corresponding end views of the staffs; Fig. 18 a plan view in detail of the contact lever locking device; and Fig. 19 a magnet wiring diagram.

As shown in the drawings, the exchange staff box may comprise a box or casing 1, (see Figs. 2 and 4) having a hinged rear cover plate 2, and a hinged front cover plate or door 3.

Within the casing 1 is a vertical partition wall 4 serving as a rear guide plate for the staffs and a front guide plate 5. The rear guide plate 4 is provided with a plurality of vertical guide slots corresponding with the number of different staffs employed, such as the slots 6, 7, and 8, and the front guide plate 5 is provided with corresponding vertical guide slots 9, 10, and 11, in alinement with the slots in the rear guide plate 4.

Within the casing 1, at the rear of the guide plate 4, is mounted a horizontal shaft 12 (see Figs. 1 and 2) having secured thereto arms 13, 14, and 15, having projecting portions adapted to aline with the axes of the enlarged openings 16, 17, and 18 at the upper ends of the slots 6, 7, and 8, and through which the staffs are inserted, the front guide plate 5 having corresponding enlarged openings 19, 20, and 21.

Secured to the shaft 12 is a depending arm 22, adapted upon partial rotation of the shaft to shift a yieldingly supported contact 23 into engagement with a contact 24 so as to close a return circuit 25 through which the energization of the operating magnets is effected.

Mounted within the casing 1 are electromagnets 26 and 27, the return circuit wire 25 being common to both magnets, the magnet 26 having a supply wire 28 and the magnet 27, a supply wire 29, connected as shown in Fig. 19.

Pivotally mounted on the magnet 26 is a weighted arm 30 adapted to be operated by the magnet stem 31 of the magnet, the arm 30 having its outer end connected through a link 32 (see Fig. 8) with a rocker arm 33. The depending arm 34 of the rocker arm is provided with a pin 35 which engages an opening in a horizontally sliding locking bar 36.

A similar arm 37 is mounted on the magnet 27 and is adapted to be operated by the magnet stem 38. The arm 37 is connected by link 39 to rocker arm 40, the depending arm 41 of which is provided with a pin 42 (see Fig. 7) for engaging an aperture in a locking bar 43 arranged at the rear of the locking bar 36. The locking bar 43 is provided with a slot 44 to permit free movement of the pin 35 and the bar 36 with a slot 45 for the pin 42.

Secured to the upper end of a vertical shaft 46 is a rocker arm 47 having a hook portion 48 (see Figs. 3, 4 and 18) at its outer end for engaging over a depending bar 49 secured to the shaft 12 for locking the arm 22 in its contacting position. At the lower end, the shaft 46 carries a horizontal arm 50, and below said arm a coil spring 51 is mounted on the shaft and has a tendency to rotate the shaft and the arm 47 to the locking position.

Secured to the shaft 46 is an arm 52 which is pivotally connected to a link bar 53 having at one end an arm 54 pivoted thereto and at the other end an arm 55. The arm 54 is secured to a pin 56 carrying a finger 57 and the arm 55 is secured to a pin 58 carrying a finger 59.

The fingers 57, 50, and 59 are so positioned as to be engaged by staffs when withdrawn from the respective lower ends of the guide slots 9, 10, and 11.

Pivotally mounted on and forwardly of the rear plate 4 are levers 60, 61, and 62 having at the upper end horizontal supporting members 63, 64, and 65 for guiding and supporting staffs inserted at the respective openings 19, 20, and 21 in the plate 5. At the lower ends, the levers 60, 61, and 62 are provided with pins 66, 67, and 68 which are adapted to engage recesses in the locking bars 36 and 43, so that a movement of either bar to the left will move all of the levers out of their staff supporting positions.

In order to prevent any operation of the arm 15 by insertion of a rod or implement other than an authorized staff, shutters 69, 70, and 71 are pivotally mounted at the rear of the upper openings 16, 17, and 18, which normally close said openings.

Pivotally mounted above the upper ends of the guide slots are fingers 72, 73, and 74 adapted to be engaged upon insertion of a staff, and secured to said fingers are arms 75, 76, and 77 having pins 78, 79, and 80 for engaging the respective shutters 69, 70, and 71.

The staffs are shown in Figs. 12, 13, and 14, the staff 81 having a squared section 82 and keys 83 and 84, the relation of the section 82 to the keys being such that the staff can only be inserted in the opening 21. The staff 85 has a squared section 86 which is so positioned with respect to the keys 83 and 84 that the staff can only be inserted in the opening 20 and the staff 87 has a squared section 88 such that the staff can only be inserted in the opening 19.

Each staff is provided with grooves 89 and 90, the intermediate wall 91 being adapted to rest between the locking bars 36 and 43 when the staffs are in position, as shown more clearly in Fig. 10.

In operation, if the tower man or train despatcher wishes the engineer to secure a staff 87, he closes a switch for energizing the magnet 26 through the circuit wire 28, although the return circuit is still open in the exchange box, at the contacts 23 and 24.

When the engineer goes to the staff exchange box for a staff, before he can withdraw a staff, he must first insert the staff in his possession, since all staffs are locked against withdrawal, so long as the magnets 26 and 27 remain deënergized. As will be seen from Fig. 7, a projection of the bar 36 locks the staff 87, a projection on the bar 43, the staff 81, and projections on both bars lock the staff 85.

If the staff in the possession of the engineer is a staff 85, he can only insert the same in the opening 20.

When the staff is inserted, the key 84 will engage and lift the finger 73 so that the pin 79 on arm 76 will be operated to shift the shutter 70, so as to uncover the rear opening 17 in the guide plate 4.

If the staff is pushed home, the inner end will engage the end of the arm 14 and rock the arm 22, so that the contacts 24 and 23 are connected, as shown in Fig. 6.

The magnet 26 will now be energized, and the rocker arm 33 will be operated to shift the locking bar 36 to the left, so that a staff 87 will be released, permitting its withdrawal. Projections on the bar 43 still engage the staffs 85 and 81 so that neither of these staffs can be removed, as will be evident from Fig. 7.

Since the pins 66, 67, and 68 of the levers 60, 61, and 62 engage projections of both bars 36 and 43, the movement of the bar 36 to the left will operate all of the levers, so that the supporting sections 63, 64, and 65 of the levers are moved to the right, permitting any staff which may have been inserted at the upper openings to drop down into the guide slots, the staffs being provided with a flat section 92 adapted to engage in the slots 9, 10, and 11, the staffs will be maintained in the positions in which they were originally inserted, as they are thus prevented from rotating.

When a staff is inserted, the finger 73 after being lifted by engagement with the key 84, as hereinbefore described, will drop back to a position between the keys 83 and 84, so as to lock the staff against removal, as shown in Fig. 6.

The movement of the shaft 12 by the arm 14, causes a rocking movement of the bar 49, so that the hook 48 of the arm 47 will engage over the bar and thus lock the contact operating arm 22 in its circuit closing position.

As the staff 87 is withdrawn, the rear key 84 engages the arm 57 and rocks same, so that the lever 54 shifts the link 53 and rocks the arm 52. The shaft 46 is thus partially rotated so as to rock the arms 50 and 47 and release the catch 48. Thus the contact operating arm 22 will be free to move so as to again open the circuit at the contacts 23 and 24.

It will thus be seen that while the inserted staff drops upon closing the magnet circuit, the contact operating arm 22 is held locked in its circuit closing position by the catch 48, until a staff is withdrawn from the staff exchange box.

Upon deënergization of the magnet 26, the locking bar 35 will be returned to its normal position by the gravity action of the weighted arm 30, so that the staff 87 which drops into the position previously occupied by the withdrawn staff, is locked against removal.

If the tower man closes the circuit for energizing the magnet 27, the bar 43 will be shifted to the left in a similar manner when a staff is inserted to close the return circuit and a staff 81 is released so that it can be withdrawn.

If both magnets are energized, then both of the locking bars are shifted to the left, thus releasing a staff 85. In this case, while the other staffs are released at one side by the movement of the locking bars, these staffs will be again locked by a projection on the bar 35 at the right engaging the staff 81 and by a projection on the bar 43 at the right engaging the staff 87, as will be evident from Fig. 7.

It follows from the operation above described that an engineer can only obtain a particular staff as authorized by the tower man or train despatcher and then only by inserting the staff already in his possession into the box at the proper place.

Also the engineer can only obtain one staff and he is prevented from operating the apparatus except by means of an authorized staff.

Having now described my invention, what I claim as new and desire to secure by Letters Patent, is:—

1. A staff exchange box provided with a plurality of staff receptacles, each adapted to contain a plurality of staffs of a different type and each receptacle having a staff receiving opening shaped to permit the insertion of one type of staff and prevent the insertion of other types.

2. A staff exchange box provided with a plurality of staff receptacles, each adapted to contain a plurality of staffs of a different type and each receptacle having a staff receiving opening shaped to permit the insertion of one type of staff and prevent the insertion of other types, and means associated with the exchange box for normally locking each type of staff against removal from the box.

3. A staff exchange box containing a plurality of different types of staffs, selectively operative means associated with said box for normally locking each type of staff against removal, and means under the control of an operator at a distant point for operating said selectively operative means to permit the withdrawal of the selected staff.

4. A staff exchange box containing a plurality of different types of staffs, means operated by an operator at a distant point for selectively determining the particular type of staff which may be withdrawn, and means operated upon insertion of a staff in the box for permitting withdrawal of the selected type of staff.

5. In a staff exchange box, the combination with a casing containing a plurality of different types of staffs, of means for locking said staffs against withdrawal and means controlled electrically by an operator at a distant point for selectively determining the operation of said locking means to permit the withdrawal of a selected staff only.

6. In a staff exchange box, the combination with a casing containing a plurality of different staffs, of means for locking said staffs against withdrawal, means controlled electrically from a distant point for operating said locking means to permit the withdrawal of a particular staff, and a switch operated by the insertion of a staff in the box for controlling the circuit of said electrically controlled means.

7. In a staff exchange box, the combination with a casing containing a plurality of different staffs, of means for locking said staffs against withdrawal, a magnet adapted upon energization for operating said means to release a staff of one type, and a magnet adapted upon energization for operating said means to release a staff of another type.

8. In a staff exchange box, the combination with a casing containing a plurality of different staffs, of means for locking said staffs against withdrawal, a magnet adapted upon energization for operating said means to release a staff of one type, a magnet adapted upon energization for operating said means to release a staff of another type, a staff of a third type being released upon energization of both magnets.

9. In a staff exchange box, the combination with a casing containing a plurality of different staffs, of a locking mechanism for locking said staffs against withdrawal and electromagnets adapted to be controlled from a distant point for operating said locking mechanism to release a staff of one type.

10. In a staff exchange box, the combination with a casing containing a plurality of different staffs, of a locking mechanism for locking said staffs against withdrawal and comprising members movable to release a staff of one type while holding the other staffs locked against removal and means controlled from a distant point for operating said members.

11. In a staff exchange box, the combination with a casing containing a plurality of different staffs, of a locking mechanism for locking said staffs against withdrawal and comprising a member movable to release a staff of one type and a member movable to release a staff of another type, the movement of both members being adapted to release a staff of a third type.

12. In a staff exchange box, the combination with a casing containing a plurality of different staffs, of a locking mechanism for locking said staffs against withdrawal and comprising a member movable to release a staff of one type and a member movable to release a staff of another type, the movement of both members being adapted to release a staff of a third type and also lock the staffs of the other types against removal.

13. In a staff exchange box, the combination with a casing containing staffs, of a member for supporting and guiding a staff as it is inserted in the box, and means operated by the insertion of a staff for moving said member away from its supporting position.

14. In a staff exchange box, the combination with a casing containing staffs, of a locking mechanism for locking said staffs against withdrawal, means operated upon insertion of a staff in the box for operating said mechanism to release a staff, a device for locking said mechanism in its staff releasing position, and means operated upon withdrawal of a staff for operating said device to release said mechanism.

15. In a staff exchange box, the combination with a casing containing staffs, of a locking mechanism for locking said staffs against withdrawal, a magnet for controlling the operation of said locking mechanism, a switch operated upon the insertion of a staff in the box for closing the circuit of said magnet, a locking device for holding the switch closed, and means operated upon withdrawal of a staff for releasing said locking device.

16. In a staff exchange box, the combination with a casing containing staffs, of a locking mechanism for locking said staffs against withdrawal, a member for supporting and guiding a staff as it is inserted in the box, and means operated upon insertion of a staff for operating said mechanism to release a staff, said member being moved away from its supporting position by the operation of said locking mechanism.

17. In a staff exchange box, the combination with a casing having an opening for the insertion of a staff and containing staffs, of a mechanism for locking said staffs against removal, means operated in the act of inserting a staff in said opening for operating said mechanism to release a staff, and a member interposed in the path of an inserted staff for preventing the operation of said means by means other than the staff.

18. In a staff exchange box, the combination with a casing having an opening for the insertion of a staff and containing staffs, of a mechanism for locking said staffs against removal, a lever operated by the insertion of a staff in said opening for operating said mechanism to release a staff, and a member interposed in the path of an inserted staff and operated only by a staff to permit the staff to operate said means.

In testimony whereof I have hereunto set my hand.

CLYDE C. FARMER.